United States Patent
Lieberman et al.

(10) Patent No.: US 9,176,328 B1
(45) Date of Patent: Nov. 3, 2015

(54) GENERIC OPTICAL MATRICES HAVING PIXELS CORRESPONDING TO COLOR AND SUB-PIXELS CORRESPONDING TO NON-COLOR EFFECTS, AND ASSOCIATED METHODS

(71) Applicant: NANOGRAFIX CORPORATION, San Diego, CA (US)

(72) Inventors: Daniel Lieberman, San Diego, CA (US); Or Lieberman, San Diego, CA (US); Rami Lieberman, San Diego, CA (US)

(73) Assignee: NANOGRAFIX CORPORATION, San Diego, CA (US)

( * ) Notice: Subject to any disclaimer, the term of this patent is extended or adjusted under 35 U.S.C. 154(b) by 0 days.

(21) Appl. No.: 14/634,663

(22) Filed: Feb. 27, 2015

Related U.S. Application Data

(60) Provisional application No. 62/114,018, filed on Feb. 9, 2015.

(51) Int. Cl.
| | |
|---|---|
| *G03H 1/00* | (2006.01) |
| *G02B 5/18* | (2006.01) |
| *G02B 27/22* | (2006.01) |
| *G02B 5/20* | (2006.01) |
| *G02B 27/26* | (2006.01) |
| *G03H 1/26* | (2006.01) |

(52) U.S. Cl.
CPC ............ *G02B 27/2214* (2013.01); *G02B 5/201* (2013.01); *G02B 27/26* (2013.01); *G03H 1/268* (2013.01)

(58) Field of Classification Search
CPC .... G02B 5/1842; G02B 5/188; G02B 5/0252; G03H 1/268; G03H 1/0244
USPC ............... 359/2, 15, 24, 567, 569, 23; 283/86
See application file for complete search history.

(56) References Cited

U.S. PATENT DOCUMENTS

| | | | |
|---|---|---|---|
| 5,138,471 A | 8/1992 | McGrew | |
| 5,396,839 A | 3/1995 | Rice | |
| 5,784,200 A * | 7/1998 | Modegi | 359/567 |
| 5,790,703 A | 8/1998 | Wang | 358/3.28 |
| 6,317,226 B1 | 11/2001 | Yeh et al. | |
| 6,392,768 B1 | 5/2002 | Yeh et al. | |
| 7,193,754 B2 | 3/2007 | Borgsmuller et al. | |
| 7,729,027 B2 | 6/2010 | Matsuyama | |
| 7,796,318 B2 | 9/2010 | Woodgate et al. | |
| 7,893,005 B2 | 2/2011 | Funada et al. | |

(Continued)

*Primary Examiner* — Audrey Y Chang
(74) *Attorney, Agent, or Firm* — Pillsbury Winthrop Shaw Pittman LLP

(57) ABSTRACT

Generic optical matrices may have pixels corresponding to color and sub-pixels corresponding to non-color effects. A generic optical matrix may include an array of pixels disposed on a substrate. The array may comprise first pixels corresponding to a first color and second pixels corresponding to a second color. The first and second pixels may be arranged in a motif such that individual ones of the first pixels are positioned adjacent to individual ones of the second pixels. Individual ones of the pixels may comprise sub-pixels. A given pixel may comprise a first and a second sub-pixel. The first sub-pixel may comprise an optical structure configured to reflect or transmit light meeting a first condition. The second sub-pixel may comprise an optical structure configured to reflect or transmit light meeting a second condition. The light reflected or transmitted by the sub-pixels may be the corresponding color of the given pixel.

13 Claims, 3 Drawing Sheets

(56) References Cited

U.S. PATENT DOCUMENTS

| | | |
|---|---|---|
| 7,934,752 B2 | 5/2011 | Saito et al. |
| 8,760,988 B2 | 6/2014 | Nakamura |
| 2002/0102007 A1 | 8/2002 | Wang .......................... 382/100 |
| 2003/0067539 A1 | 4/2003 | Doerfel et al. ................. 348/51 |
| 2004/0101982 A1 | 5/2004 | Woontner |
| 2004/0252867 A1 | 12/2004 | Lan et al. ..................... 384/124 |
| 2005/0174620 A1 | 8/2005 | Woontner |
| 2006/0098005 A1 | 5/2006 | Yung |
| 2006/0250671 A1 | 11/2006 | Schwerdtner et al. ............ 359/9 |
| 2007/0109643 A1 | 5/2007 | Lee et al. |
| 2007/0195391 A1* | 8/2007 | Nishikawa et al. ............. 359/15 |
| 2008/0192343 A1 | 8/2008 | Miyawaki et al. ............. 359/462 |
| 2008/0198468 A1 | 8/2008 | Kaule et al. ................... 359/575 |
| 2008/0199803 A1 | 8/2008 | Matsuyama |
| 2008/0231925 A1 | 9/2008 | Tateishi et al. |
| 2008/0240787 A1 | 10/2008 | Saito et al. |
| 2008/0246897 A1 | 10/2008 | Gaudreau ....................... 349/15 |
| 2008/0299332 A1 | 12/2008 | Matsuyama |
| 2009/0251749 A1* | 10/2009 | O'Boyle et al. ................... 359/2 |
| 2009/0303597 A1 | 12/2009 | Miyawaki et al. ............ 359/559 |
| 2010/0165134 A1 | 7/2010 | Dowski et al. ................ 348/218 |
| 2010/0171811 A1 | 7/2010 | Kamins-Naske et al. ....... 348/40 |
| 2011/0002019 A1 | 1/2011 | Routley et al. ..................... 359/9 |
| 2011/0187747 A1 | 8/2011 | Mccarthy et al. ............. 345/634 |
| 2013/0215472 A1 | 8/2013 | Rossier et al. .............. 358/3.06 |
| 2013/0261782 A1 | 10/2013 | Becken et al. .................. 700/95 |
| 2015/0219807 A1 | 8/2015 | Lochbihler ................... 359/567 |

* cited by examiner

GENERIC OPTICAL MATRICES HAVING PIXELS CORRESPONDING TO COLOR AND SUB-PIXELS CORRESPONDING TO NON-COLOR EFFECTS, AND ASSOCIATED METHODS

CROSS REFERENCE TO RELATED APPLICATIONS

This application claims the priority benefit of U.S. Provisional Patent Application No. 62/114,018 filed on Feb. 9, 2015 and entitled "GENERIC OPTICAL MATRICES HAVING PIXELS CORRESPONDING TO COLOR AND SUB-PIXELS CORRESPONDING TO NON-COLOR EFFECTS, AND ASSOCIATED METHODS," which is incorporated herein by reference.

FIELD OF THE DISCLOSURE

This disclosure relates to generic optical matrices having pixels corresponding to color and sub-pixels corresponding to non-color effects, and associated methods.

BACKGROUND

Optical images that create two-dimensional and/or three-dimensional effects may typically be printed using lenticular lens techniques, holographic techniques, and/or stereographic techniques. As these different techniques have come to be used more and more, a need has arisen in the printing industry for the capability of generating such images quickly and at low cost and of integrating them into ink printing machinery so that they can easily be incorporated in printed materials such as labels, packaging, security printouts, and/or other printed materials. As it presently stands, these techniques generally involve long production waiting times and limited to specialized companies such as holographic companies.

Indeed, to date, the implementation of optical images that create two-dimensional and/or three-dimensional effects within printing applications has generally been costly and time-consuming. In the case of holograms, these may be produced by holographic companies that have very expensive equipment. The process may be slow and costly. Contemporary hologram technology may require companies that have an optical laboratory in which the hologram is made on a photoresist plate. The optical laboratory may include laser equipment, anti-vibration tables, other specialized equipment, and trained personnel. Once a hologram is initially made, it may be called a master, but it may not be used for large-scale production. As such, the company may also need an electroforming laboratory, where the photoresist master is introduced into a bath of nickel sulfamate for the purpose of cultivating a nickel copy on the surface of the photoresist. Once the nickel is of sufficient thickness, it may be separated from the photoresist copy in order to create a negative copy of the original image. It is from this nickel that the laboratory may cultivate a series of copies that may later be called nickel shims and may be used to engrave the image on a variety of supporting materials.

Next, in order to engrave the image, it may be necessary to have special equipment. Depending on the final product, there may be additional equipment for different applications. These processes often take several days and are processes that are completely distinct from ink printing. For the purpose of using these optical structures, the printers customarily rely on specialized companies (e.g., holographic companies) that generate the required images according to their needs. In addition to the investment of additional time needed to interface with those specialized companies, printers may be required to invest in equipment that enables the printer to transfer the optical structures onto their printed products.

SUMMARY

One aspect of the disclosure relates to a generic optical matrix having pixels corresponding to color and sub-pixels corresponding to non-color effects. Exemplary implementations may enable printers throughout the world to have the capability to generate optical structures as if they were an additional "ink" at an additional "ink" station in their printing equipment. Some implementations may enable printers to vary the optical image that is being printed. The generic optical matrix may be used in conjunction with a negative and a UV lacquer (or other approach) to selectively obliterate certain pixels and/or sub-pixels to instantly create an optical image that may be used to print optical images in printing equipment.

While the present disclosure relates primarily to the generic optical matrix, itself, exemplary implementations for generating a negative are discussed in concurrently filed U.S. patent application Ser. No. 14/634,671 entitled "SYSTEMS AND METHODS FOR GENERATING NEGATIVES OF VARIABLE DIGITAL OPTICAL IMAGES BASED ON DESIRED IMAGES AND GENERIC OPTICAL MATRICES," and exemplary implementations for obliterating certain pixels and/or sub-pixels are described in concurrently filed U.S. patent application Ser. No. 14/634,648 entitled "SYSTEMS AND METHODS FOR FABRICATING VARIABLE DIGITAL OPTICAL IMAGES USING GENERIC OPTICAL MATRICES," which are both incorporated herein by reference.

Exemplary implementations may provide to printers an ability to control all aspects of their production, including the generation of complex optical images (e.g., holograms) without having to invest in expensive and complex optics and equipment for the application thereof. In other words, exemplary implementations may facilitate continuous systems that are easily and inexpensively integrated into printers' prepress and production departments. As a result, printers may be able to supply their clients quickly with a combination of prints and complex optical images at reasonable cost during prepress and production.

Some implementations may facilitate instantly or rapidly creating optical structures on a large-scale to create many types of images without the use of laser, electroforming, expensive molds, and/or embossing equipment. Applications of these optical structures may include emphasizing the aesthetic effect of a label; providing 3D prints for augmented reality and/or virtual reality systems (e.g., Microsoft® HoloLens™); making packaging more attractive to the consumer; adding security to government documents, paper currency, credit cards, passports, labels, packaging, and/or other security applications; and/or other applications.

According to some implementations, they may facilitate recording, molding, and/or printing optical structures in such a manner that they turn out to be variable, meaning that after individual printing cycles a new and different optical image can be instantly produced. For example, an optical image may change from label to label with a purpose of increasing security of the product on which the label has been adhered, and/or with a purpose of personalizing packaging with a unique optical characteristic for individual packages. This is digital printing of optical structures.

Some implementations may be used with traditional printing equipment, digital equipment, desktop printers, and/or other equipment setups with the purpose of producing optical structures continuously or on demand with the ink printing of these machines. As such, the cost of generating these optical images may be dramatically reduced and may approach costs that are more similar to those of pre-printing in the printing industry.

In contrast to contemporary technologies for generating optical images, exemplary implementations may not require creating a new image from the ground up every time a new or altered image is desired. According to some implementations, the generic optical matrix may be used to instantly generate some type of image which can later be engraved, molded, displayed on 3D monitors or other displays, and/or be combined with prints from other printing techniques involving conventional printing equipment, rotogravure, inkjet printing, digital printing, offset printing, laser printing, desktop printers, laser coders, inkjet encoding equipment, and/or other printing techniques.

In accordance with some implementations, the generic optical matrix may have pixels corresponding to color and sub-pixels corresponding to non-color effects. The generic optical matrix may include a substrate and an array of pixels disposed on the substrate. The array may include first pixels corresponding to a first color and second pixels corresponding to a second color. The first color may be different from the second color. The first pixels and second pixels may be arranged in a motif such that individual ones of the first pixels are positioned adjacent to individual ones of the second pixels. Individual ones of the pixels may include sub-pixels. A given pixel may include a first sub-pixel and a second sub-pixel. The first sub-pixel may include an optical structure configured to reflect or transmit light meeting a first condition. The second sub-pixel may include an optical structure configured to reflect or transmit light meeting a second condition. The first condition may be different from the second condition. The light reflected or transmitted by the first sub-pixel and the second sub-pixel may be the corresponding color of the given pixel.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
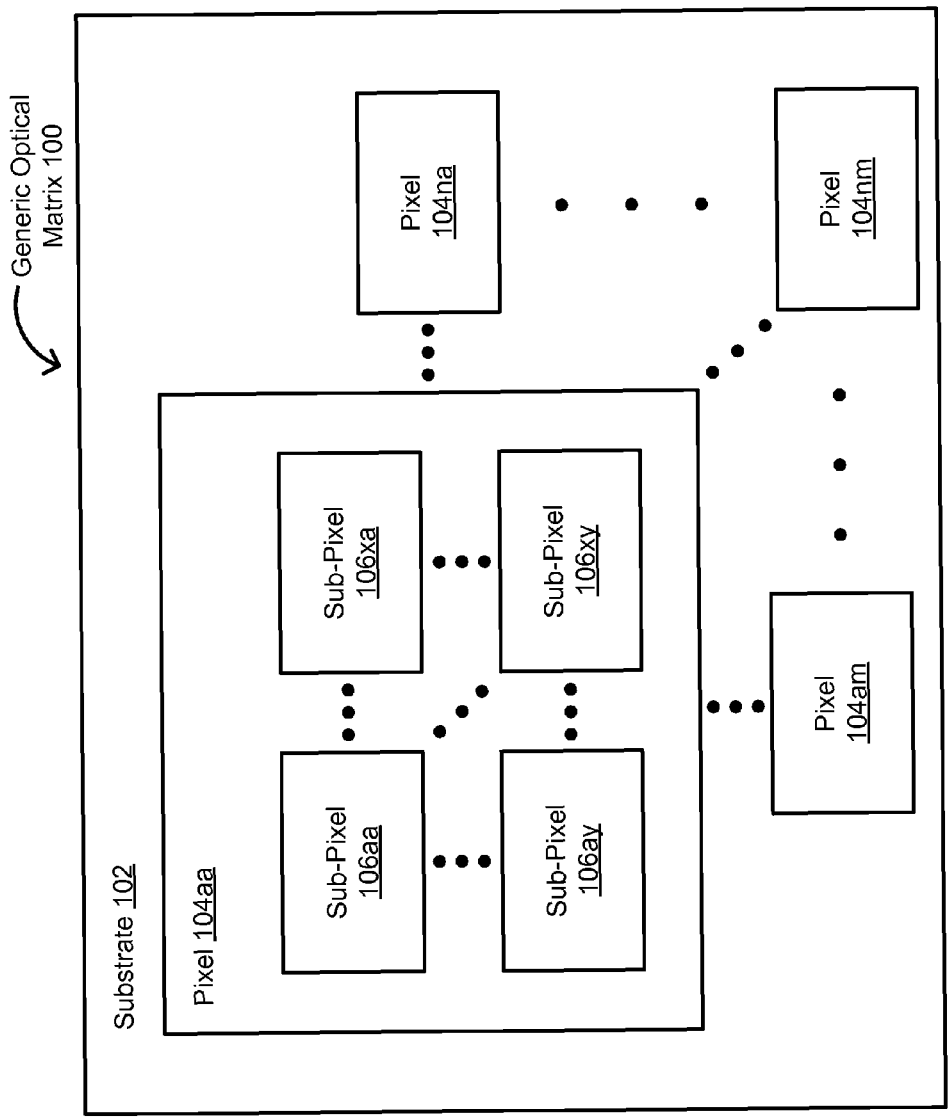
FIG. 1 illustrates a generic optical matrix having pixels corresponding to color and sub-pixels corresponding to non-color effects, in accordance with one or more implementations.

FIG. 1 illustrates a generic optical matrix 100, in accordance with one or more implementations. As depicted, the generic optical matrix 100 may include a substrate 102 with pixels 104 corresponding to color and sub-pixels 106 corresponding to non-color effects.

The substrate 102, depending on the specific implementation, may include a variety materials and/or form factors. According to various implementations, generic optical matrix 100 may be configured to reflect light (e.g., in printing applications) and/or to transmit light (e.g., in display applications). As such, substrate 102 may be transparent, translucent, and/or opaque. The substrate 102 may be flat and/or curved. The substrate 102 may be rigid, semi-rigid, and/or flexible. In some implementations, substrate 102 may include one or more of photoresist, nickel plate, polyester film, silicon, polycarbonate film, ultraviolet cured material, and/or other materials. The substrate 102 may be sized according to specific implementation. According to various implementations, substrate 102 may cover an area with one linear dimension being as small as 0.01 microns (or smaller) and/or with one linear dimension being as large as 90 inches (or larger).

The pixels 104 may be disposed on substrate 102 as an array. The total number of pixels 104 in the array may depend on the size of substrate 102 and/or the spatial resolution of the generic optical matrix 100. For example, low resolution may be used for printing three-dimensional posters that can be seen at a given distance (e.g., one meter, two meters, ten meters, fifty meters, and/or other distances). High resolution may be used for labels with micro- or nano-texts, hidden images, and/or other security features. According to various implementations, the number of pixels 104 in the array may be hundreds, thousands, millions, billions, or other quantities. The array of pixels 104 may have a resolution in the range of one (or less) pixel per inch to 500,000 (or more) pixels per inch. The array of pixels 104 may be arranged as one or more of a square lattice, a hexagonal lattice, triangular lattice, rectangular lattice, a random or pseudorandom arrangement, and/or other arrangements. Individual ones of pixels 104 may be shaped as a circle, a square, a rectangle, a line, an oval, a rounded square, dots, and/or other shapes.

Different pixels 104 may correspond to different colors. That is, some of pixels 104 may reflect and/or transmit one color of light while other pixels 104 may reflect and/or transmit another color of light. The color of a given pixel may depend on an angle at which the given pixel is viewed. For example, as a viewing angle changes, a color of light reflected or transmitted by the given pixel may change (e.g., by sweeping through the range of visible colors). In some implementations, the array may include first pixels 104 corresponding to a first color and second pixels 104 corresponding to a second color. The first color may be different from the second color. The array may further include third pixels 104 corresponding to a third color. The third color may be different from the first color and the second color. In some implementations, the array may further include fourth pixels 104 corresponding to a fourth color. The fourth color may be different from the first color, the second color, and the third color. In sum, the array may include pixels corresponding to any number of different colors. According to some implementations in which the color scheme is binary, the first and second pixels 104 may respectively correspond to blue and red (or other colors). In some implementations in which the color scheme is ternary (e.g., RGB), the first, second, and third pixels 104 may respectively correspond to red, green, and blue (or other colors). In some implementations in which the color scheme is quaternion (e.g., CMYK), the first, second, third, and fourth pixels 104 may respectively correspond to cyan, magenta, yellow, and black (or other colors). Although certain color schemes are described above, it will be appreciated that other color schemes are contemplated and are within the scope of the disclosure.

In the array, pixels 104 may be arranged in a motif. Generally speaking, a motif may describe a distinctive and recurring pattern. According to some implementations, first pixels 104 and second pixels 104 may be arranged in a motif such that individual ones of first pixels 104 are positioned adjacent to individual ones of second pixels 104. In implementations having third pixels 104, they may be arranged in the motif such that individual ones of third pixels 104 are positioned adjacent to individual ones of first pixels 104 and individual ones of second pixels 104. In implementations having fourth pixels 104, they may be arranged in the motif such that individual ones of fourth pixels 104 are positioned adjacent to individual ones of first pixels 104, individual ones of second pixels 104, and individual ones of third pixels 104. In some implementations, similar pixels may not be positioned adjacent to each other (e.g., no two first pixels positioned adjacent to each other). Although pixels 104 may be arranged in a motif, as discussed above, this should not be viewed as limiting as other arrangements are contemplated and are within the scope of the disclosure. For example, pixels 104 may be arranged randomly in the array. As another example, multiple different motifs may be used such that pixels 104 in some areas of the array are arranged in a first motif and pixels 104 in other areas of the array are arranged in a second motif.

Figure 2:
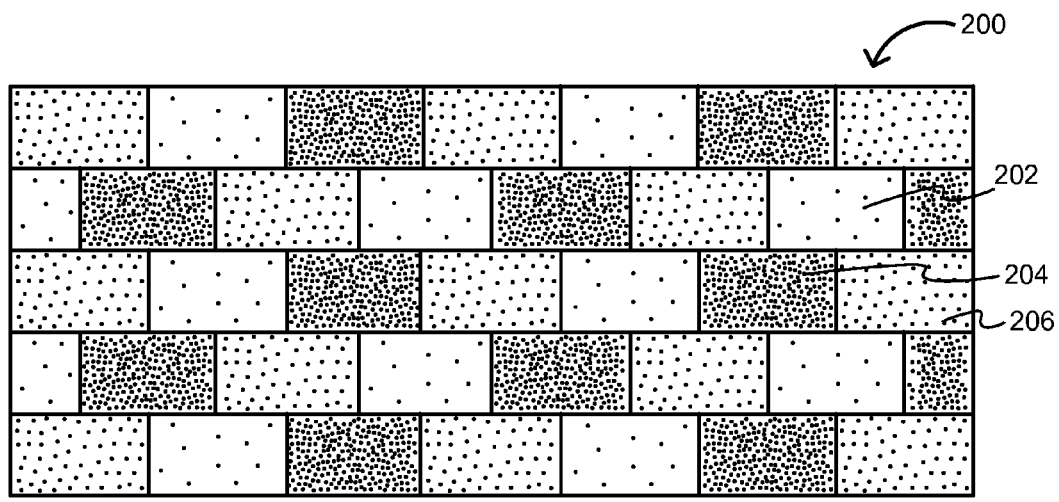
FIG. 2 illustrates an exemplary array of pixels, in accordance with one or more implementations.

FIG. 2 illustrates an exemplary array 200 of pixels, in accordance with one or more implementations. As depicted in FIG. 2, array 200 may include pixels corresponding to three different colors. Pixels similar to pixel 202 may correspond to a first color, pixels similar to pixel 204 may correspond to a second color, and pixels similar to pixel 206 may correspond to a third color. Pixels similar to pixel 202, pixels similar to pixel 204, and pixels similar to pixel 206 may be respectively arranged in superimposed hexagonal lattices such that a given pixel is adjacent to pixels of different colors and pixels of a common color are evenly distributed across array 200.

Referring again to FIG. 1, a given pixel 104 may include two or more sub-pixels 106. The sub-pixels 106 may be arranged within a given pixel 104 as one or more of a square lattice, a hexagonal lattice, triangular lattice, rectangular lattice, random or pseudorandom arrangement, and/or other arrangements. Individual ones of sub-pixels 106 may be shaped as a circle, a square, a rectangle, a line, an oval, a rounded square, dots, spirals, patterns, and/or other shapes.

Figure 3:
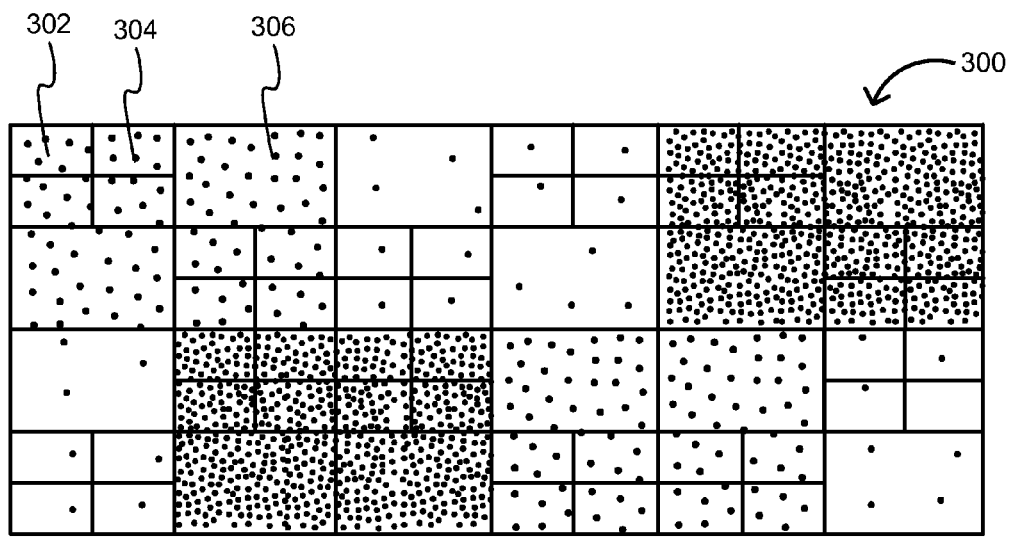
FIG. 3 illustrates an exemplary array of pixels with sub-pixels, in accordance with one or more implementations.

FIG. 3 illustrates an exemplary array 300 of pixels with sub-pixels, in accordance with one or more implementations. As depicted in FIG. 3, a given pixel may include one or more of sub-pixel 302, sub-pixel 304, sub-pixel 306, and/or other sub-pixels. The sub-pixel 302, sub-pixel 304, and/or sub-pixel 306 may be similar or different with respect to optical characteristics and/or physical characteristics. Examples of optical characteristics may include one or more of reflectivity, transmissivity, absorptivity, and/or other optical characteristics. Examples of physical characteristics may include size, shape, and/or other physical characteristics.

Turning again to FIG. 1, individual ones of sub-pixels 106 may correspond to non-color effects. The non-color effects may result from optical characteristics and/or physical characteristics of individual ones of sub-pixels 106. Such non-color effects may be achieved by optical structures included in sub-pixels 106. An optical structure of a given sub-pixel 106 may include one or more of a ruled grating, a laser grating, a photonic grating, an e-beam grating, an ion beam grating, gratings created by nanoholes, a hologram, a three-dimensional nano-structure, a kinegram, a photonic structure, a Fresnel lens, an electron-beam grid, an exelgram, an optical variable device (OVD), a diffractive optically variable image device (DOVID), a zero order device, a pixelgram (e.g., as provided by CSIRO of Australia), a holographic stereogram, a diffraction identification device (DID), a dielectric structure, a volume hologram, a liquid crystal, an interference security image structure (ISIS), a computer-generated hologram, an electron-beam grating, and/or other optical structures. In some implementations, a given optical structure may include a physical feature having a linear dimension in the range of 0.01 microns to 1000 microns. In some implementations, optical structures of sub-pixels 106 of a given pixel 104 may be configured such that some reflections/transmissions go to the right eye of a person viewing generic optical matrix 100 and other reflections/transmissions go to the left eye.

Individual optical structures of sub-pixels 106 may be configured (and/or physically structured) to reflect and/or transmit light meeting one or more conditions. For example, a given pixel 104 may include a first sub-pixel 106 and a second sub-pixel 106. The first sub-pixel 106 may include an optical structure configured to reflect and/or transmit light meeting a first condition. The second sub-pixel 106 may include an optical structure configured to reflect and/or transmit light meeting a second condition. The first condition may be different from the second condition. The light reflected and/or transmitted by the first sub-pixel 106 and the second sub-pixel 106 may be the corresponding color of the given pixel 104. The given pixel 104 may include a third sub-pixel 106 and a fourth sub-pixel 106. The third sub-pixel 106 may include an optical structure configured to reflect and/or transmit light meeting a third condition. The fourth sub-pixel 106 may include an optical structure configured to reflect and/or transmit light meeting a fourth condition. The light reflected and/or transmitted by the third sub-pixel 106 and the fourth sub-pixel 106 being the corresponding color of the given pixel 106. The third condition may be different from the first condition, the second condition, and the fourth condition. While only four conditions are described here, in some implementations, there may be any number of conditions.

The conditions associated with reflection and/or transmission may include conditions related to one or more of viewing angle, viewing distance, polarization, intensity, scattering, refractive index, birefringence, and/or other conditions. Continuing the example in the above-paragraph, the first condition and the second condition may relate to a first viewing angle. The first condition may be that the light reflected or transmitted by the optical structure of the first sub-pixel 106 is directed toward a left eye of a person observing generic optical matrix 100 from the first viewing angle. The second condition may be that the light reflected or transmitted by the optical structure of the second sub-pixel 106 is directed toward a right eye of the person observing generic optical matrix 100 from the first viewing angle. The third condition and the fourth condition may relate to a second viewing angle. The third condition may be that the light reflected or transmitted by the optical structure of the third sub-pixel 106 is directed toward the left eye of the person observing generic optical matrix 100 from the second viewing angle. The fourth condition may be that the light reflected or transmitted by the optical structure of the fourth sub-pixel 106 is directed toward a right eye of the person observing generic optical matrix 100 from the second viewing angle. The first viewing angle may be different from the second viewing angle.

Continuing the example in the above-paragraph, the first condition and the second condition may relate to a first viewing distance. The first condition may be that the light reflected or transmitted by the optical structure of the first sub-pixel 106 is directed toward the left eye of the person observing generic optical matrix 100 from the first viewing distance. The second condition may be that the light reflected or transmitted by the optical structure of the second sub-pixel 106 is directed toward the right eye of the person observing generic optical matrix 106 from the first viewing distance. The third condition and the fourth condition may relate to a second viewing distance. The third condition may be that the light reflected or transmitted by the optical structure of the third sub-pixel 106 is directed toward the left eye of the person observing 100 generic optical matrix from the second viewing distance. The fourth condition may be that the light reflected or transmitted by the optical structure of the fourth sub-pixel 106 is directed toward the right eye of the person observing generic optical matrix 100 from the second viewing distance. The first viewing distance may be different from the second viewing distance. In some implementations, images may be created from generic optical matrix that are viewable with only one eye (or view point) such as for dynamic optical effects.

Still continuing the example in the above-paragraph, the first condition and the second condition may relate to polarization. The first condition may be that the light reflected or transmitted by the optical structure of the first sub-pixel 106 has a first polarization. The second condition may be that the light reflected or transmitted by the optical structure of the second sub-pixel 106 has a second polarization. The first polarization may be different from the second polarization.

Figure 4:
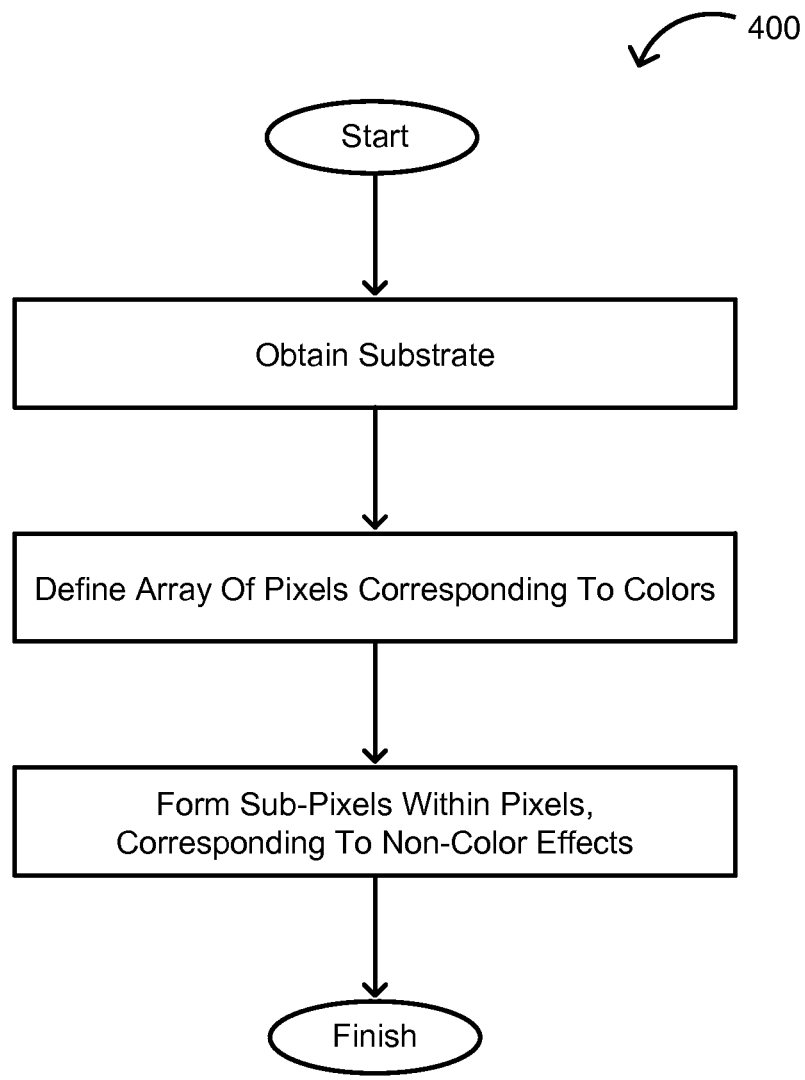
FIG. 4 illustrates a method for fabricating a generic optical matrix having pixels corresponding to color and sub-pixels corresponding to non-color effects, in accordance with one or more implementations.

FIG. 4 illustrates a method 400 for fabricating a generic optical matrix having pixels corresponding to color and sub-pixels corresponding to non-color effects, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At a step 402, a substrate may be obtained. In accordance with one or more implementations, the substrate may be same as or similar to substrate 102 described in connection with FIG. 1.

At a step 404, an array of pixels disposed on the substrate may be defined. The array may include first pixels corresponding to a first color and second pixels corresponding to a second color. The first color may be different from the second color. The first pixels and second pixels may be arranged in a motif such that individual ones of the first pixels are positioned adjacent to individual ones of the second pixels. In accordance with one or more implementations, the pixels may be the same as or similar to pixels 104 described in connection with FIG. 1.

At a step 406, sub-pixels may be formed within individual ones of the pixels. A given pixel may comprise a first sub-pixel and a second sub-pixel. The first sub-pixel may include an optical structure configured to reflect or transmit light meeting a first condition. The second sub-pixel may include an optical structure configured to reflect or transmit light meeting a second condition. The first condition may be different from the second condition. The light reflected or transmitted by the first sub-pixel and the second sub-pixel may be the corresponding color of the given pixel. In accordance with one or more implementations, the sub-pixels may be the same as or similar to sub-pixels 106 described in connection with FIG. 1.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A generic optical matrix having pixels corresponding to color and sub-pixels corresponding to non-color effects, the generic optical matrix comprising:
   a substrate; and
   an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels;
   wherein individual ones of the pixels comprise sub-pixels, a given pixel comprising a first sub-pixel and a second sub-pixel, the first sub-pixel comprising a first optical structure configured such that light reflected or transmitted by the first optical structure of the first sub-pixel is directed toward a left eye of a person observing the generic optical matrix from a first viewing angle, the second sub-pixel comprising a second optical structure configured such that light reflected or transmitted by the second optical structure of the second sub-pixel is directed toward a right eye of the person observing the generic optical matrix from the first viewing angle, the light reflected or transmitted by the first sub-pixel and the second sub-pixel being the corresponding color of the given pixel.

2. The generic optical matrix of claim 1, wherein the substrate includes one or more of photoresist, nickel plate, polyester film, silicon, polycarbonate film, or ultraviolet substrate.

3. The generic optical matrix of claim 1, wherein:
   the array further comprises third pixels corresponding to a third color;
   the third color is different from the first color and the second color; and
   the third pixels are arranged in the motif such that individual ones of the third pixels are positioned adjacent to individual ones of the first pixels and individual ones of the second pixels.

4. The generic optical matrix of claim 3, wherein:
   the array further comprises fourth pixels corresponding to a fourth color;
   the fourth color is different from the first color, the second color, and the third color; and
   the fourth pixels are arranged in the motif such that individual ones of the fourth pixels are positioned adjacent to individual ones of the first pixels, individual ones of the second pixels, and individual ones of the third pixels.

5. The generic optical matrix of claim 1, wherein the given pixel comprises a third sub-pixel and a fourth sub-pixel, the third sub-pixel comprising a third optical structure configured such that light reflected or transmitted by the third optical structure of the third sub-pixel is directed toward a left eye of a person observing the generic optical matrix from the second viewing angle, the fourth sub-pixel comprising a fourth optical structure configured such that light reflected or transmitted by the fourth optical structure of the fourth sub-pixel is directed toward a right eye of the person observing the generic optical matrix from the second viewing angle, the light reflected or transmitted by the third sub-pixel and the fourth sub-pixel being the corresponding color of the given pixel.

6. The generic optical matrix of claim 1, wherein a given optical structure includes one or more of a grating, a hologram, a kinegram, a Fresnel lens, a diffractive optically variable image device, a pixelgram, a holographic stereogram, a diffraction identification device, a dielectric structure, a volume hologram, an interference security image structure, a computer-generated hologram, or an electron-beam grating.

7. The generic optical matrix of claim 1, wherein the array of pixels is arranged as one of a square lattice, a hexagonal lattice, triangular lattice, rectangular lattice, a random arrangement, or a pseudorandom arrangement.

8. The generic optical matrix of claim 1, wherein individual ones of the pixels are shaped as a circle, a square, a rectangle, a line, an oval, a rounded square, or dots.

9. The generic optical matrix of claim 1, wherein the optical matrix covers an area with one linear dimension being in the range of 0.01 microns to 90 inches.

10. The generic optical matrix of claim 1, wherein the array of pixels has a resolution in the range of one pixel per inch to 500,000 pixels per inch.

11. A method for fabricating a generic optical matrix having pixels corresponding to color and sub-pixels corresponding to non-color effects, the method comprising:
   obtaining a substrate;
   defining an array of pixels disposed on the substrate, the array comprising first pixels corresponding to a first color and second pixels corresponding to a second color, the first color being different from the second color, the first pixels and second pixels being arranged in a motif such that individual ones of the first pixels are positioned adjacent to individual ones of the second pixels; and
   forming sub-pixels within individual ones of the pixels, a given pixel comprising a first sub-pixel and a second sub-pixel, the first sub-pixel comprising a first optical structure configured such that light reflected or transmitted by the first optical structure of the first sub-pixel is directed toward a left eye of a person observing the generic optical matrix from the first viewing angle, the second sub-pixel comprising a second optical structure configured such that light reflected or transmitted by the second optical structure of the second sub-pixel is directed toward a right eye of the person observing the generic optical matrix from the first viewing angle, the light reflected or transmitted by the first sub-pixel and the second sub-pixel being the corresponding color of the given pixel.

12. The method of claim 11, wherein:
the array further comprises third pixels corresponding to a third color;
the third color is different from the first color and the second color; and
the third pixels are arranged in the motif such that individual ones of the third pixels are positioned adjacent to individual ones of the first pixels and individual ones of the second pixels.

13. The method of claim 11, wherein:
the given pixel comprises a third sub-pixel and a fourth sub-pixel;
the third sub-pixel comprises a third optical structure configured such that light reflected or transmitted by the third optical structure is directed toward a left eye of a person observing the generic optical matrix from a second viewing angle;
the fourth sub-pixel comprises a fourth optical structure configured such that light reflected or transmitted by the fourth optical structure is directed toward a right eye of a person observing the generic optical matrix from the second viewing angle; and
the light reflected or transmitted by the third sub-pixel and the fourth sub-pixel being the corresponding color of the given pixel.

\* \* \* \* \*